United States Patent [19]

Gilath et al.

[11] Patent Number: 4,563,701
[45] Date of Patent: Jan. 7, 1986

[54] DIGITAL DIAGNOSTIC IMAGING SYSTEM

[75] Inventors: Chaim Gilath, Rechovot; Haim Melman, Herzlia, both of Israel

[73] Assignee: Elscint Ltd., Haifa, Israel

[21] Appl. No.: 551,699

[22] Filed: Nov. 14, 1983

[51] Int. Cl.⁴ ............................................. H04N 5/32
[52] U.S. Cl. .................................... 358/111; 364/414; 378/99
[58] Field of Search .................. 358/111; 378/99, 115, 378/92, 114, 190, 191, 192, 62, 63; 128/653, 654; 364/414; 40/361

[56] References Cited

U.S. PATENT DOCUMENTS

| | | | |
|---|---|---|---|
| 4,076,984 | 2/1978 | Gromov et al. | 378/99 X |
| 4,181,939 | 1/1980 | Lyons | 128/654 |
| 4,360,731 | 11/1982 | Fink et al. | 378/99 |
| 4,433,429 | 2/1984 | Finkenzeller et al. | 378/99 |

Primary Examiner—Howard W. Britton
Assistant Examiner—Victor R. Kostak
Attorney, Agent, or Firm—Sandler & Greenblum

[57] ABSTRACT

A medical diagnostic imaging system that selectively digitizes and processes video data obtained from either a radiographic or a fluorographic source.

11 Claims, 2 Drawing Figures

DIGITAL DIAGNOSTIC IMAGING SYSTEM

FIELD OF THE INVENTION

This invention is concerned with diagnostic imaging systems and more particularly with such systems used for enhancing both fluorographic and radiographic images.

BACKGROUND OF THE INVENTION

The X-Ray departments of hospitals and clinics originally were equipped with X-Ray machines wherein a photographic image of the interior of the human body was acquired after the film was exposed in the X-Ray machine and was developed. Subsequently fluorographic equipment was added which enabled th clinician to view images of the interior of the patient's body in a real-time on line basis.

As the state of the art advanced digital fluorographic and digital radiographic systems have been introduced. Those systems have proven so versatile and useful to X-Ray image enhancement that almost all X-Ray departments, in hospitals and clinics and many doctors are endeavoring to equip their X-Ray facilities with both digital radiographic and digital fluoroscopic systems.

As used herein the digital radiographic systems are systems wherein the radiation detector does not include an image intensifier. Instead it uses photographic film or a similar surface providing an image fixed in the material exposed to the radiation. The image enhancement accomplished with digital radiography is performed on an after acquisition basis. The image enhancement accomplished with digital fluorography is generally performed on a real time on-line basis or on an after acquisition basis.

The equipment for either a good digital radiographic or digital fluorographic station are both expensive. It is uneconomical and often impossible for hospitals to afford both types of stations. When the hospitals which serve specific locations are not equipped with the necessary equipment for non-invasive diagnoses the portions of the public serviced by such hospitals are the real losers. The hospitals also lose the revenues generated by diagnostic imaging equipment. Accordingly those in the field are continuously attempting to minimize the cost of such equipment without degrading the services provided with such equipment.

Accordingly it is an object of the present invention to provide digital diagnostic imaging systems for providing image enhancement of both fluorographic and radiographic generated images at a fraction of the cost of separate digital fluorographic and digital radiographic systems.

BRIEF DESCRIPTION OF THE INVENTION

According to a broad aspect of the invention, an improved medical diagnostic video imaging system is provided, said system comprises:
(a) video processor means for processing data from a video camera to digital data representative of objects viewed by said video camera,
(b) means for operating on the digital data to enhance images of said objects,
(c) display means for displaying the enhanced images, and
(d) means for selectively providing video data to said processor from either a radiographic or fluorographic source.

According to a feature of the invention the system is provided with means for converting either hard images such as X-Ray film or fluorographic images such as those on image intensifiers into video signals. The video signals from either source are processed on the same equipment.

A related feature of the invention uses the same video camera-means for converting the input signals i.e. from an image intensifier or from a film illuminator to video signals.

Yet another feature of the invention uses film illuminator equipment with film or similar hard images thereby, enabling a ready comparison between an x-ray film taken in the past and an on-line fluorographic display.

BRIEF DESCRIPTION OF THE DRAWINGS

The above mentioned and other features and objects of the invention will be more fully understood in the following detailed description of embodiments of the invention made in conjunction with the attached drawings, wherein.

GENERAL DESCRIPTION

Figure 1:
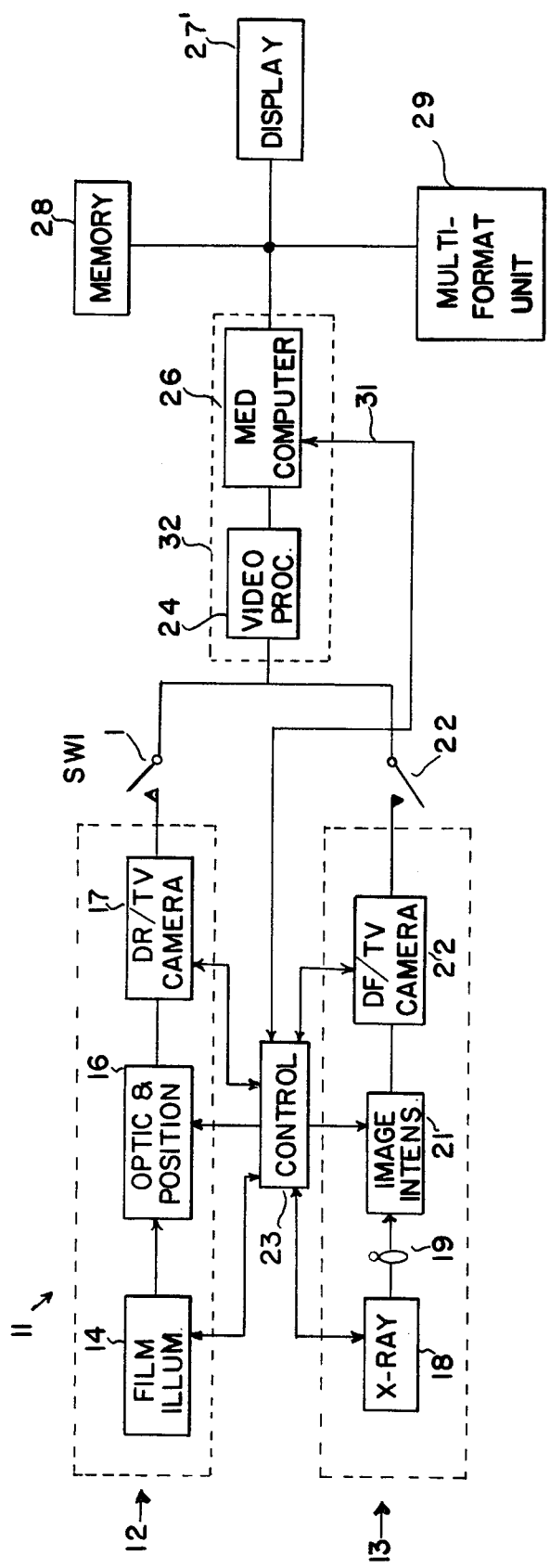
FIG. 1 is a block diagram showing of a first embodiment of the invention.

The digital diagnostic imaging system 11 of FIG. 1 combines both a radiographic data input channel 12 and fluorographic data input channel 3. The radiographic input channel 12 is shown as including a film illuminator 14, an optical and positioning unit 16 and a video camera 17. While a film illuminator is shown, it should be understood that any hard copy, radiograph viewer can be used within the scope of the invention.

The fluorographic input channel 13 includes an X-Ray source 18 for supplying penetrating radiation which is directed through an object such as a patient 19 to an image intensifier 21. A video camera 22 is optically coupled to the image intensifier and provides video output signals that are a function of the image on the image intensifier 21.

The radiographic input section and the fluorographic input section are shown as being controlled by unit 23. The unit 23 preferably also controls switch SW1 that is used to select either the radiographic or fluorographic data for further processing. Thus the control unit 23 operates SW1-1 to the closed position responsive to the operation of the film illuminating unit 14 or operates SW1-2 to the closed position responsive to the operation of the X-Ray source 18. Switch SW1 as shown operates as an OR gate to close either contacts SW1-1 or SW1-2. Switch SW1 may also be operated manually within the scope of the invention.

The signals from the selected input are digitized and processed in the video processor unit 24 which shares computation duties with a medical computer unit 26 for image enhancement. The output of the medical computer is generally the data for the display of the enhanced image on display unit 27, which could be a disk memory. The image could be committed to memory 28. Alternatively the image data could be used in conjunction with a multi-format camera 29 to provide film records of the images and provide a side-by-side display of the past x-ray film record and the present fluorographic record.

The control unit 23 and the medical computer 24 are shown linked by conductor 31.

Thus the system shown in FIG. 1 provides a unit whereby, for example, the hospital need not acquire two separate units i.e. a digital radiographic unit and a digital fluorgoraphic unit. It's conventional X-Ray fluorographic unit can be used and a film or radiographic viewer can be added. Both of these units (radiographic and fluorographic) can be interfaced with the same image enhancement section 32.

Figure 2:
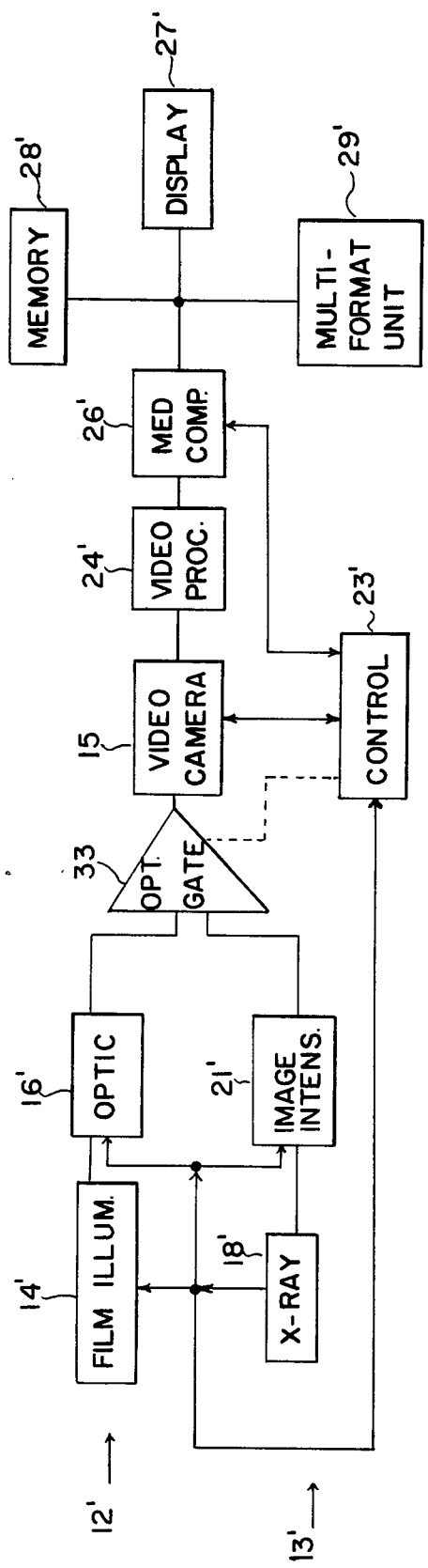
FIG. 2 is a block diagram showing of another embodiment of the invention.

According to another embodiment of the invention shown in FIG. 2, the two data inputs sections 12' and 13' are optically coupled to one video camera 15 through an optical gate 33 controlled by control unit 23'. The optical gate contains mechanical and optical elements enabling the camera to view either the film presented on illuminator unit 16' or the image intensifier 21'. With the system of FIG. 2 there are added expenditures on the optics and fewer expenditures in the video equipment. (Note that when possible the equipment of FIG. 2 is designated by the numbers of FIG. 1 primed).

Either of the options drastically reduces the expenditure for equipping hospitals, clinics and doctor's offices with digital image enhancing systems for both flurography and radiography. The inventive system enables the use of the same equipment and software to both radiograhic and fluorographic displays. It should be noted that multiple displays could be used on a multiplex basis if both the fluorographic and radiographic inputs are used simultaneously.

While the invention has been described with reference to certain specific embodiments it must be recognized that this description is made by way of example and not as a limitation on the scope of the invention which is defined by the appended claims.

What is claimed is:

1. A medical diagnostic video imaging system for providing display images of objects, said system comprising:
   (a) video processing means for processing data receiving from video camera means to convert said data to digital data;
   (b) computer means for operating on the digital data to enhance the images of the objects;
   (c) display means for displaying the enhanced images;
   (d) means for selectively providing video data to said processor from either a radiographic or fluorographic source, and
   (e) said radiographic source including film illuminator means whereby an x-ray film recorded in the past can be readily compared with a fluorographic display.

2. The imaging system of claim 1 wherein said video processing means comprises a radiographic channel and a fluorographic channel, each of said channels having a separate video camera.

3. The imaging system of claim 2 wherein said means for selectively providing video data comprises means for selecting the output of either the camera in said radiographic channel or the camera in said fluorographic channel.

4. The imaging system of claim 3 wherein said selecting means comprises gate means.

5. The imaging system of claim 3 wherein said selecting means comprises switch means, said switch means operates to connect the output of one channel while disconnecting the output of the other channel.

6. The system of claim 1 wherein said video processing means comprises a radiographic channel and a fluorographic channel, each of said channels using a same video camera to provide said data.

7. The system of claim 6 wherein said means for selectively providing data comprises selecting means for causing said same video camera to receive inputs from either said radiographic channel or from said fluorographic channel.

8. The system of claim 7 wherein said selecting means comprises optical gate means.

9. The system of claim 7 wherein said selecting means comprises multiplexing means to enable said radiographic channel and said fluorographic channel to be used substantially simultaneously, whereby the comparison of the x-ray film and the fluorographic display is facilitated.

10. The system of claim 2 wherein said display means comprises multiformat means for providing a film record of the image of the fluorographic channel, and means for using said film record in said radiographic channel for further enhancement.

11. The system of claim 1 wherein said display means comprises multi-format means to provide side-by-side display of the x-ray film and the fluorographic display.

* * * * *